Feb. 4, 1969   H. J. McCAULEY   3,425,312
WEDGE NUT
Filed Aug. 8, 1966
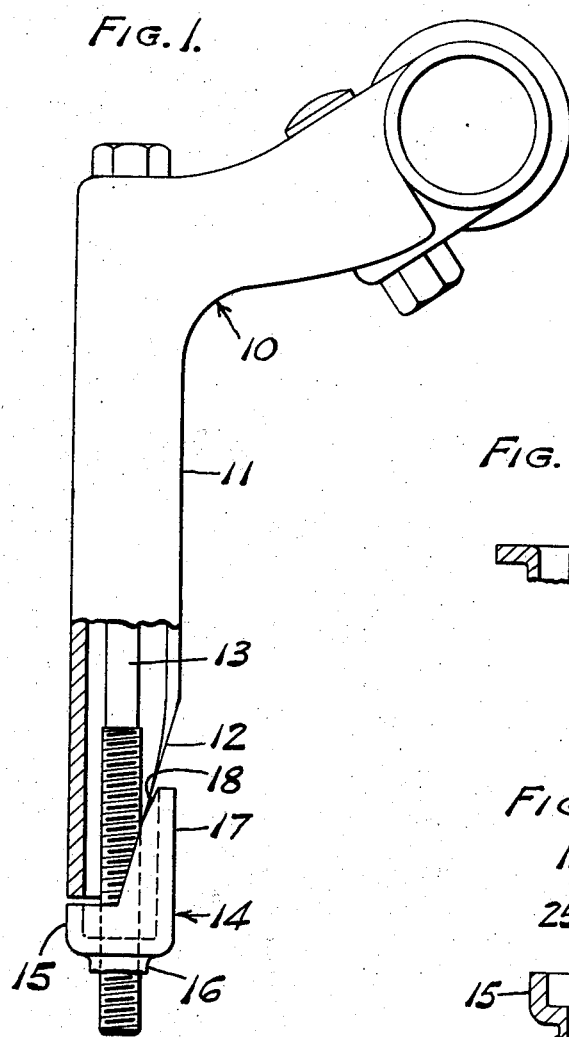
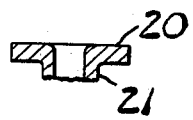
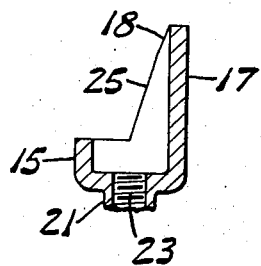
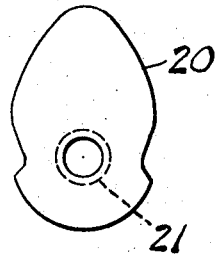
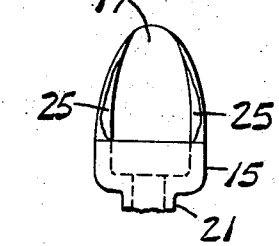
INVENTOR.
HERBERT J. McCAULEY
BY
*Christel + Bean*
ATTORNEYS

United States Patent Office 3,425,312
Patented Feb. 4, 1969

3,425,312
WEDGE NUT
Herbert J. McCauley, 86 Dana Road,
Buffalo, N.Y. 14216
Filed Aug. 8, 1966, Ser. No. 571,088
U.S. Cl. 85—32                    2 Claims
Int. Cl. F16b *37/00, 33/04*

ABSTRACT OF THE DISCLOSURE

A wedge nut for bicycle stems having a drawn sheet metal cup-shaped body portion consisting of a radial end wall and an annular wall extending axially therefrom with the annular wall cut at an angle to the axis to provide opposed wedging surfaces, together with a coaxial tubular formation extending from the radial wall in a direction opposite to the aforesaid annular wall, the tubular portion being internally threaded to receive a clamping screw.

---

This invention relates to bicycle steering posts or handle bar supports and particularly to a novel wedge nut for securing such handle bar supports in the front wheel fork bearing of a bicycle.

For many years wedge nuts of bicycle handle bar supports consisted of metal forgings or castings but in more recent years attempts have been made to provide wedge nuts comprising metal stampings. Examples of such sheet metal wedge nuts are found in my prior patents—No. 2,487,661, dated Nov. 8, 1949 and No. 3,006,230, dated Oct. 31, 1961. In the former of these prior patents the wedge nut is stamped from sheet metal but the arrangement is such that a very heavy gauge metal must be employed to afford even a minimum length of thread engagement with the tightening screw or bolt, and even then the length of thread contact is the weakest part of the clamping structure. Furthermore, in the construction of this patent the threaded portion is subject to bending and deflection under the tightening action of the steering post screw or bolt.

In my subsequent Patent No. 3,006,230 a more highly developed wedge nut is disclosed but such construction is subject to certain difficulties, particularly in the case of smaller diameter steering posts such as are currently employed. With such smaller diameter posts a wedge nut constructed according to this patent must necessarily be of a thinner gauge metal than is satisfactory, due to the limitations imposed by the forming of two concentric arcuate portions, an inner portion for receiving the screw and an outer portion which includes the angular wedge faces.

The present invention provides a sheet metal wedge nut for bicycle steering posts and analogous uses wherein a fairly heavy gauge of metal may be employed as desired but wherein adequate strength and simple forming operations are afforded without necessarily employing unduly thick sheet metal in forming the wedge nut. Speaking generally, the wedge nut of the present invention comprises two coaxial tubular formations, one adapted to be interiorly threaded for engagement with the steering post screw or bolt, and the other adapted to present the required wedging faces. The two coaxial portions are connected by a common radial wall portion and the entire wedge nut is formed by relatively simple metal drawing operations. Furthermore, the interiorly threaded tubular portion of the wedge nut of the present invention affords an entirely adequate length of thread engagement so that this part of the wedge nut does not present a weak point, as in prior constructions.

While a single specific embodiment of the principles of the present invention is illustrated in the accompanying drawing and described in detail in the following specification, it is to be understood that such embodiment is by way of example only and that various mechanical modifications may be made without departing from the spirit of the invention.

In the drawing:
FIG. 1 is a side elevational view of a bicycle steering post employing one form of the wedge nut of the present invention;
FIG. 2 is a central cross sectional view of the wedge nut of FIG. 1 viewed as in FIG. 1;
FIG. 3 is an elevational view of the wedge nut of FIGS. 1 and 2 viewed from the left-hand side of these figures;
FIG. 4 illustrates the blank from which the wedge nut of FIGS. 1 through 3 is formed, including the step of tubular formation thereof; and
FIG. 5 is a transverse cross sectional view through the blank of FIG. 4.

Like characters of reference denote like parts throughout the several figures of the drawing and, referring to FIG. 1, the numeral 10 designates generally a bicycle steering post of well known form which is generally the same as that illustrated in my prior patents identified above. The steering post 10 includes a depending tubular portion 11 which is beveled at its lower end as at 12 and is adapted to be inserted in the hollow upper bearing portion of the front fork member of a bicycle. A screw or bolt 13 passes downwardly through the tubular portion 11 of post 10 and is engaged at its lower end by the wedge nut of the present invention, the same being designated generally by the numeral 14 in FIG. 1.

It will be noted that the wedge nut 14 consists essentially of a cup-shaped portion 15 and a tubular extension 16 of reduced diameter with respect to the cup-shaped portion. The annular wall of cup-shaped portion 15 has an upward extension 17 which is formed to present inclined surfaces 18.

Referring now to the general manner in which the wedge nut 14 is fabricated in the instance set forth herein by way of example, a blank 20 of the general form shown in FIG. 4 is perforated and the walls of the perforation are drawn to form a tubular extension designated 21 in FIGS. 4 and 5. The blank is then drawn in a draw die to form the cup-shaped portion 15 and the extension 17 thereof. The final operations in completing the wedge nut of the present invention comprise interiorly threading the tubular extension 21 as at 23 and a coining or swaging operation to provide properly disposed wedging surfaces.

After the drawing operation which forms the cup-shaped portion 15 and its upward extension 17, the inclined sheet metal edges of the upward extension 17 will not be coplanar and will be somewhat distorted due to the drawing operation. Accordingly, following the drawing operation, the part is placed in a die and subjected to a coining or swaging operation which flattens at least portions of the edge surfaces 18 as indicated at 25 in FIG. 3, to present such surfaces so that they are coplanar with respect to each other and disposed at a proper angle for smooth wedging engagement against the surface 12 of the tubular portion 11 of the bicycle steering post.

A wedge nut formed in accordance with the foregoing disclosure comprises extremely simple and straightforward metal fabrication steps involving relatively inexpensive dies and provides a wedge nut of greatly superior strength, low cost, and with adequate thread engagement with respect to the screw or bolt of the steering post assembly.

I claim:
1. A wedge nut comprising a sheet metal stamping having a drawn cup-shaped body portion comprising a radial end wall and an annular wall surrounding said end wall, said annular wall having a relatively low portion at one side thereof of substantially uniform height and a portion at the other side thereof of substantially greater height, each of said portions having a circumferential extent of substantially 180 degrees, the inner edges of said higher wall portion being generally planar and extending at an acute angle to the axis of said annular wall and intersecting said relatively low portion, said radial end wall having a tubular extension of less diameter than said annular wall and coaxial therewith extending from said radial end wall in an opposite axial direction opposite to that of said annular wall from said radial end wall, said tubular extension being internally threaded to receive a clamping screw.

2. A wedge nut in accordance with claim 1 wherein said inner edges of said inclined wall portion are swaged to provide co-planar wedging surface portions.

References Cited

UNITED STATES PATENTS

| | | | |
|---|---|---|---|
| 1,309,616 | 7/1919 | Eisler | 85—32 |
| 1,316,640 | 9/1919 | Parsons | 85—79 |
| 1,964,427 | 6/1934 | Chandler | 85—79 |
| 2,058,064 | 10/1936 | Culbertson | 85—32 |
| 2,487,661 | 11/1949 | McCauley | 74—551.6 |
| 2,769,990 | 11/1956 | Pawsat | 85—32 |

EDWARD C. ALLEN, *Primary Examiner.*

U.S. Cl. X.R.

85—79.